Aug. 8, 1939.                J. BERNSTEIN                2,168,615
TRANSPORT TANK STRUCTURE
Filed June 20, 1936
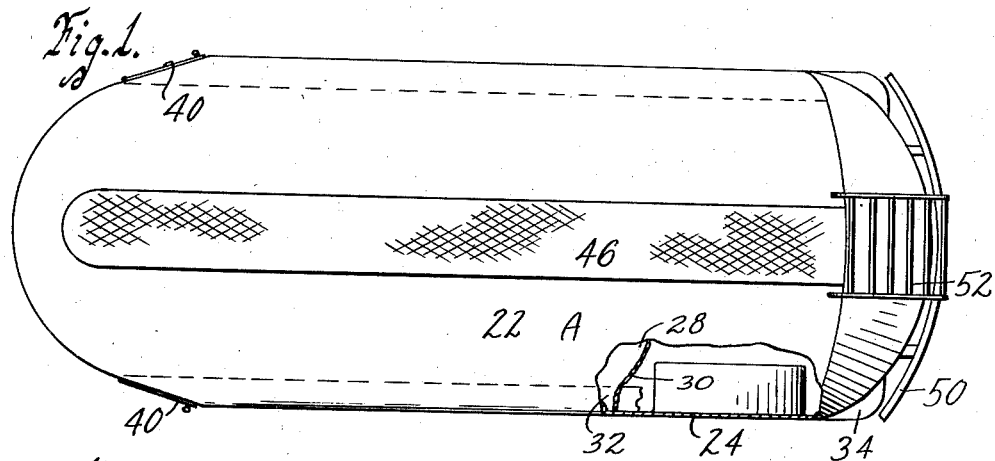
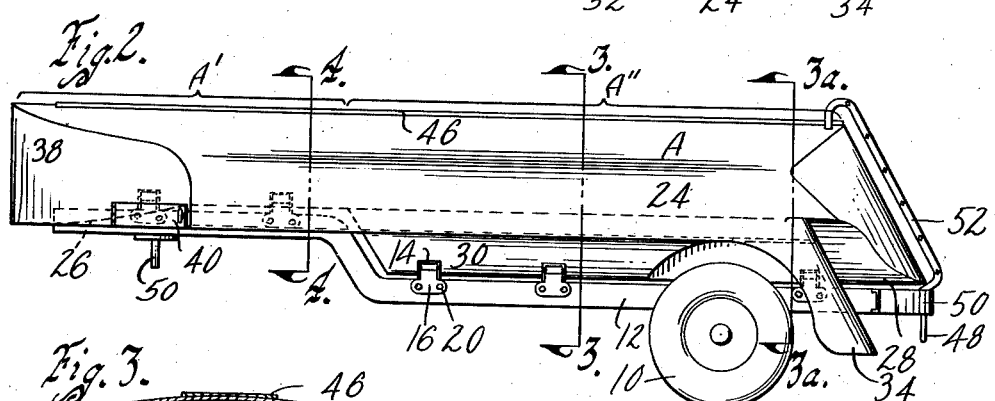
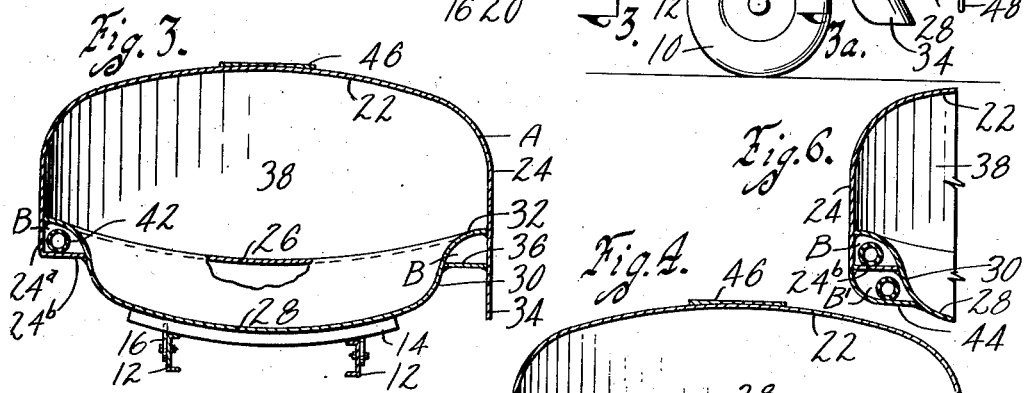
Inventor
Jacob Bernstein
By Bair, Freeman & Sinclair
Attorneys
Witness
H. S. Wenzenmaier Patented Aug. 8, 1939

2,168,615

UNITED STATES PATENT OFFICE 2,168,615

TRANSPORT TANK STRUCTURE

Jacob Bernstein, Omaha, Nebr.

Application June 20, 1936, Serial No. 86,331

1 Claim. (Cl. 220—1)

An object of my invention is to provide a transport tank structure of simple, durable and inexpensive construction.

A further object is to provide a transport tank of the stream lined trailer type with a novel means for supporting and storing the lengths of discharge hose used to transfer the contents from the tank to an underground storage tank or the like.

Still a further object is to provide means in connection with a transport tank for storing discharge hose in a compartment so constructed and associated with the tank that it does not take up a prohibitive amount of room.

More particularly it is my object to provide in a transport tank structure a cylindrical tank having indentations formed along opposite sides thereof and cover plates for the indentations whereby passageways are provided for storing hose or the like.

A further object is to provide a cylindrical tank of a novel shape, which provides for longitudinal groove-like indentations to receive discharge hose or the like, and at the same time reinforce the sides of the tank against buckling.

Another object is to so associate a hose passageway with a transport tank that the tank can be made comparatively low, yet with a minimum of weight for material.

A further object is to provide means for mounting a transport tank on a wheeled frame comprising channel shaped cradle bars opening downwardly and attaching plates welded between the flanges thereof and bolted or otherwise secured to the chassis of a wheeled frame.

With these and other objects in view my invention consists in the construction, arrangement and combination of the various parts of the device, whereby the objects contemplated are attained, as hereinafter more fully set forth, pointed out in my claim, and illustrated in the accompanying drawing, in which:

Figure 1 is a plan view of a transport tank structure embodying my invention.

Figure 2 is a side elevation of the same.

Figure 3 is an enlarged sectional view of the left half thereof on the line 3—3 of Figure 2, and the right half on the line 3a—3a of Figure 2.

Figure 4 is a similar view on the line 4—4 of Figure 2.

Figure 5 is a perspective view of an attaching plate, which I use for mounting the tank on the frame; and Figure 6 is a sectional view similar to the left side of Figure 3 showing a modified construction.

On the accompanying drawing I have used the reference numeral 10 to indicate a wheel. Two of the wheels 10 are provided and these are journalled on a frame or chassis 12.

I provide a tank A supported on the frame 12 in the following manner: A plurality of channel shaped cradle bars 14 (five of them being illustrated on the drawing) are provided on which the tank A rests. It may be welded or otherwise secured to the cradle bars. Mounted between the flanges of each channel shaped cradle bar 14 are a pair of attaching plates 16. These may be welded or otherwise suitably secured to the channel bars to render them substantially an integral part thereof.

The attaching plates 16 are each provided with a pair of perforations 18 and bolts 20 extend through the perforations and through similar perforations in the frame 12.

During assembly, the cradle bars 14 are positioned on the frame 12, and it is then merely necessary to insert a drill in the perforations 18 and drill through the frame 12 in order to properly locate the perforations in the frame to receive the bolts 20.

The tank A has a front portion A' and a rear portion A'' of substantially greater height. The upper portion of the tank is formed by a top wall 22 and side walls 24. The bottom of the front portion A' comprises a curved plate 26, while the bottom of the rear portion A'' consists of a plate having a central portion 28, upwardly bent side portions 30 and outwardly bent terminal edges 32. The terminal edges 32 are welded to the side walls 24 and serve to prevent buckling of the side walls due to the portions 32 being at substantially right angles to the walls 24. This serves as a very effective means to eliminate buckling of the side walls 24.

Hose passageways B are provided in the form of extensions 24a of the side walls 24, which extend downwardly from the junction between the elements 32 and 34 and then inwardly as at 24b.

The inner edges of the portions 24b may be welded or otherwise suitably secured to the portions 32 of the bottom for the portion A'' of the tank. Instead of bending the side walls 24 as indicated at 24a and 24b, these two portions may be of separate material.

Rearward of the wheels 10 a mud guard 34 is provided which may be a further extension of the wall 24 as illustrated at the right side of Figure 3, in which case a plate 36 will be provided as a filler to form an extension of the bottom wall 24b of the passageway B, shown at the left side of Figure 3.

Ahead of the portion A" of the tank, the wall 24 may have a further portion 24c having its terminal edge secured to the bottom plate 26 of the tank portion A' to extend the passageways B to the front wall 38 of the tank. In this front wall I preferably provide doors 40 for closing the forward ends of the hose passageways B. These passageways are adapted for supporting lengths of discharge hose 42 usually provided for transferring the contents of the tank A to an underground tank or other place of storage.

Heretofore it has been customary to provide runways along the sides of the transport tank, and hose carrying passageways suspended beneath them. Most state laws limit the width of a trailer, and accordingly such runways take up part of the permitted width. With my construction the tank A may be made the maximum width, and can thus be made lower than those having runways at the sides, and yet obtain the same capacity. I then provide a runway 46 on the top of the tank along the center thereof with a step 48 on the rear bumper 50 and a ladder 52 for climbing up to the runway.

If desired I may, as shown in Figure 6, provide a cover plate 44 in addition to the cover plates 24a and 24b, to provide a second hose passageway B'. A modification of this character and others also may be made without departing from the real spirit of my invention, and it is my intention to cover by my claim any modified forms of structure or use of mechanical equivalents which may be reasonably included within its scope.

I claim as my invention:

In a transport tank structure, a cylindrical tank having a substantially elliptical portion of relatively small height and a second substantially elliptical portion of relatively greater height and a hose receiving passageway comprising a longitudinal indentation at the side of said second portion for forming two sides of such passageway, a cover plate for enclosing said indentation and forming two other sides for such passageway, said cover plate extending along said first portion of said tank to provide an extension of such passageway and to form two sides for such extension and having a flange to form a third side therefor, said first portion of said tank forming a fourth side therefor.

JACOB BERNSTEIN.